(12) United States Patent
Vande Giessen et al.

(10) Patent No.: US 8,828,466 B2
(45) Date of Patent: Sep. 9, 2014

(54) READY-TO-EAT CEREAL WITH REDUCED SUGAR COATING

(75) Inventors: Timothy Vande Giessen, Kalamazoo, MI (US); Sylvia Schonauer, Battle Creek, MI (US); James Kincaid, Battle Creek, MI (US); Katherine Nemeth, Battle Creek, MI (US); Mary Steele, Battle Creek, MI (US); Helbert Almeida Dominguez, Battle Creek, MI (US); Aileen Diana Tanojo, Battle Creek, MI (US)

(73) Assignee: Kellogg Company, Battle Creek, MI (US)

( * ) Notice: Subject to any disclaimer, the term of this patent is extended or adjusted under 35 U.S.C. 154(b) by 115 days.

(21) Appl. No.: 13/297,371

(22) Filed: Nov. 16, 2011

(65) Prior Publication Data

US 2012/0121773 A1    May 17, 2012

Related U.S. Application Data

(60) Provisional application No. 61/414,241, filed on Nov. 16, 2010.

(51) Int. Cl.
| | |
|---|---|
| *A23P 1/08* | (2006.01) |
| *A23L 1/307* | (2006.01) |
| *A23L 1/0522* | (2006.01) |
| *A23L 1/00* | (2006.01) |
| *A23L 1/164* | (2006.01) |
| *A23L 1/18* | (2006.01) |
| *A23G 3/34* | (2006.01) |

(52) U.S. Cl.
CPC ............ *A23L 1/0047* (2013.01); *A23L 1/05223* (2013.01); *A23V 2002/00* (2013.01); *A23L 1/1641* (2013.01); *A23L 1/307* (2013.01); *A23L 1/1817* (2013.01); *A23G 3/343* (2013.01)
USPC .......................................... 426/289; 426/548

(58) Field of Classification Search
USPC .................................................. 426/548, 289
See application file for complete search history.

(56) References Cited

U.S. PATENT DOCUMENTS

| 2,884,413 A * | 4/1959 | Kerr Ralph W et al. ........ 536/106 |
| 2008/0193606 A1 | 8/2008 | Fritzsching et al. |
| 2009/0202697 A1 * | 8/2009 | Erickson et al. .............. 426/548 |
| 2010/0003370 A1 * | 1/2010 | De Baets ......................... 426/61 |
| 2010/0112174 A1 * | 5/2010 | Christensen et al. .......... 426/548 |

FOREIGN PATENT DOCUMENTS

WO    2010097217 A2    9/2010

OTHER PUBLICATIONS

International Search Report, Dated Feb. 21, 2012, 3 Pages.

* cited by examiner

*Primary Examiner* — Carolyn Paden
(74) *Attorney, Agent, or Firm* — Honigman Miller Schwartz and Cohn; Kathryn D. Soulier; Jonathan P. O'Brien

(57) ABSTRACT

Disclosed is a reduced sugar coating for coating a variety of food products including ready-to-eat cereals, granola, trail mix, energy bars, granola bars, cookies, cakes, pies, crackers, and muffins. The reduced sugar coating provides a frosted appearance to the food products and permits up to 50% reduction of the sugar in a coating composition while maintaining the taste, texture and function of a full sugar coating composition. The removed sugar is replaced by a type 4 resistant starch in an amount of from 0.1 to 1.0 parts of type 4 resistant starch per every 3 parts of removed sugar. Preferably the source of the type 4 resistant starch is potato, however the source can also comprise wheat, corn, rice, tapioca, quinoa, a legume, barley, banana, sorghum, oat, millet, sweet potato, or mixtures thereof.

14 Claims, No Drawings

READY-TO-EAT CEREAL WITH REDUCED SUGAR COATING

CROSS-REFERENCE TO RELATED APPLICATIONS

This application claims the benefit of U.S. Provisional Patent Application Ser. No. 61/414,241 for a READY-TO-EAT CEREAL WITH REDUCED SUGAR COATING, filed on Nov. 16, 2010, which is hereby incorporated by reference in its entirety.

BACKGROUND OF THE INVENTION

Many ready-to-eat (RTE) cereals include an outer coating comprised mostly of sugar. These coatings provide for enhanced bowl life of the cereal in milk, meaning the length of time until the cereal becomes soggy in the milk. In addition, the coatings serve to create a crispy texture that is not brittle and a frosted appearance to the outside of RTE cereals when desirable. Consumers enjoy RTE cereals that have these outer coatings because of the enhanced sweetness and taste that they provide in addition to the frosted appearance. Recently consumers have been asking for lower calorie RTE cereals that still have the same sweetness and appearance, but with a reduction in the calories from sugar. Parents also want a reduction in the amount of sugar consumed by children from all sources including from cereal.

One way to reduce sugar levels in sugar coated RTE cereals would be to replace all or a portion of the sugar with artificial sweeteners. However, many of the known artificial sweeteners have off flavors that a segment of the consuming public can detect and finds offensive. US application publication 2006/0286223, discloses use of maltodextrin having a dextrose equivalent (DE) value of 20 or less to replace sugar in sugar coatings for RTE cereals at levels of from 16 to 28%. Another issue raised by the removal of the sugar from the coating is that the bulk provided by the sugar needs to be replaced and the frosted appearance of the outside of the cereal will also be dramatically affected when sugar is removed from the coating. Thus one needs to replace the bulk and maintain the frosted appearance and taste that consumers associate with an existing product when sugar is removed from the coating for that product.

It is desirable to provide a sweet coating for a food product such as a RTE cereal that has a reduced sugar level while maintaining the bulk, taste and appearance of a full sugar coating. It is desirable to do so without resorting to use of artificial sweeteners.

DESCRIPTION OF THE INVENTION

One aspect of the invention provides a reduced sugar coating for food products such as RTE cereals, for example cereal puffs and cereal flakes. The present invention provides a RTE product having an appearance and taste similar to existing sweet, coated RTE cereals, such as Apple Jacks™ and Frosted Flakes™ provided by the Kellogg Company. However, the RTE cereals of the present invention include a lower amount of sugar than the comparable existing RTE cereals. The reduced sugar coating of the present invention can replace the sugar coatings currently used in RTE cereal products.

In one embodiment, the reduced sugar coating is formed by preparing a sugar and water mixture, for example a 67 Brix liquid sugar syrup having a reduced amount of sugar compared to the original formulation. The liquid sugar syrup with a reduced amount of sugar is then mixed with a type 4 resistant starch that is used to replace the removed sugar. Most preferably, the type 4 resistant starch is a type 4 resistant potato starch. However, the type 4 resistant starch can include other types of type 4 resistant starches or mixtures of type 4 resistant starches such as those from wheat, corn, rice, tapioca, and quinoa. Other potential sources of type 4 resistant starches include legume, barley, banana, sorghum, oat, millet and sweet potato. In another embodiment, the reduced sugar coating is formed from the type 4 resistant starch sugar replacement, and natural and/or artificial sweeteners. As stated above, the resistant starch used in the present invention is a type 4 resistant starch. Resistant starches are classified as type 1, type 2, type 3 or type 4. Resistant starches pass through the small intestine of humans and are not digested. In the large intestine they are fermented. Type 1 resistant starches are ones that are physically inaccessible to digestion because they are in a matrix making them digestion resistant. They are found naturally in sources such as certain seeds, legumes and some unprocessed whole grains. Type 2 resistant starches are ones that occur in their natural granular form and are resistant to digestion in that form such as those found in uncooked potato, green banana flour, and high amylase corn. Type 3 resistant starch is formed when certain starchy foods are cooked and then cooled. These are found in cooked and cooled legumes, bread, cornflakes, potatoes and retrograded high amylose corn. These resistant starches are formed during the cooling re-association and crystallization of the starch. Type 4 resistant starches are starches that have been chemically modified to make them resistant to digestion. These are not naturally occurring starches and they can have a wide variety of structures including cross-linked starches, starch esters and starch ethers. The type 4 resistant starch of the present invention replaces the bulk lost by removal of the sugar and surprisingly it maintains the frosted appearance of the coated cereal. In the past others have resorted to artificial coloring agents like $TiO_2$ to create a white or frosted appearance on a sugar coated RTE cereal.

In one embodiment, the type 4 resistant starch is provided in an amount of 0.1 to 10.0 weight percent (wt %) based on the total weight of the coated food product, preferably 1.0 to 6.0% by weight, and most preferably from 1 to 5% by weight. As noted a preferred food product is a ready to eat (RTE) cereal coated with a reduced sugar coating prepared according to the present invention. In one embodiment, the optimum percentage of resistant starch to maintain product density or bulk is 3.0 wt % to 5.0 wt % based on the total RTE cereal formulation weight. Preferably the type 4 resistant starch is used to replace the removed sugar in a ratio of from 0.1 to 1 part type 4 resistant starch for every 3 parts of sugar removed, more preferably in a ratio of from 0.6 to 1 part type 4 resistant starch for every 3 parts of sugar removed. So for example a removal of 3 grams of sugar from a coating syrup would be replaced with from 0.1 to 1 grams of type 4 resistant starch. The total amount of resistant starch added to a coating does need to be monitored however because at too high of a level it can provide an undesirable organoleptic effect. It is often described as a chalky type taste when the level of resistant starch is too high, such as over 10% by weight of the final food product.

In another embodiment, the reduced sugar coating made with type 4 resistant starch can include a natural or artificial high intensity sweetener and/or other flavors and additives. High intensity sweeteners are known to those of skill in the art and include stevia, aspartame, sucralose, neotame, acesulfame potassium, and saccharin. The high intensity sweeteners can be used to maintain the sweetness in the reduced sugar coatings of the present invention if necessary.

The reduced sugar coatings of the present invention can be used to coat a wide variety of food products that typically have a sugar coating. These products include all forms of RTE cereal; granola type products and so called trail mixes; energy bars and granola bars; baked goods with sugar coatings such as cookies, cakes, pies, crackers and muffins; and other hand held foods. In one embodiment, a reduced sugar coating created using the type 4 resistant starch is applied to an uncoated RTE cereal, for example cereal puffs to provide a product similar to existing Apple Jack™s, or cereal flakes to provide a product similar to existing Frosted Flakes™. The reduced sugar coatings of the present invention can enhance the white colored frosted appearance of the product and sugar crystallization characteristic of the cereal pieces. The type 4 resistant starch thus allows the reduced sugar syrup to maintain the current product frosted cereal image, such as the image of existing frosted coated RTE cereals, such as Apple Jacks™ or Frosted Flakes™.

In one embodiment, the reduced sugar coating is applied to cereal puffs. The reduced sugar coating is applied to the dry cereal puffs by any method known in the art. In one embodiment, the reduced sugar coating is sprayed onto the dry cereal pieces. The coating can be provided in the form of a coating slurry that is sprayed through a spray nozzle to coat the base cereal pieces. Sprinkles or other toppings, such as apple cinnamon granules or salt brine, can be applied to the cereal puffs, on top of the reduced sugar coating. Vitamins can be applied to the cereal puffs, for example by spraying a vitamin mixture onto the coated cereal puffs either before or after the reduced sugar coating.

In another embodiment, the reduced sugar coating of the present invention is applied to cereal flakes. The reduced sugar coating is applied to dried, cooked cereal flakes, which are know in the art. The reduced sugar coating includes the type 4 resistant starch. A vitamin spray can also be applied to the coated cereal flakes.

The reduced sugar coating can be applied to other RTE cereals, which can include puffs, flakes, clusters, or other types of cereal known in the art. The reduced sugar coating could also be applied to other food products, such as breakfast bars, cookies, crackers, and other snack foods as described above.

One aspect of the invention enables reduction in sugar content of coatings for presweetened cereals while maintaining similar taste, texture, mass, throughput, and appearance meaning frosted look and even coverage of the base cereal material. The invention achieves the similar taste and mass while reducing sugar level through the use of type 4 resistant starch. The starch enables the appearance and color to be maintained with reduced manufacturing complexity by using a resistant starch type 4 blended into the coating slurry during processing. The resistant starch type 4 also allows the syrup to be an opaque color causing the end product to have a white frosted appearance. The RTE cereal including the reduced sugar coating has an appearance similar to or equal to the conventional RTE cereals including sugar coatings, such as existing Apple Jacks™ and Frosted Flakes products.

EXAMPLES

Example formulations of RTE cereals including the reduced sugar coating of the present invention are provided. The first example includes cereal puffs as the base cereal and provides in the reduced sugar coating only 9 grams of sugar per 28 gram serving as opposed to a full sugar product that has 12 grams of sugar per 28 gram serving. The type 4 resistant starch is a potato starch. In a preferred embodiment the coating syrup of the reduced sugar coating has from 78 to 88% by weight of sugar solids in it. The coating comprises the concentrated liquid sugar, flavor, and the type 4 resistant potato starch. The base cereal is coated with the coating at the indicated range level. Preferably the reduced sugar coatings of the present invention are used at levels of from 10 to 60% by weight based on the total weight of the coated food product, more preferably at a level of from 30 to 50% by weight. After coating the flavor granules and salt brine are applied to the coated cereal.

Example 1

Coated RTE Cereal Puffs

| Component | Weight % range |
| --- | --- |
| Base cereal puffs | 59-65 |
| Concentrated liquid sugar | 29-35 |
| Flavor | 0.1-0.5 |
| Type 4 resistant potato starch | 1.0-4.0 |
| Flavor granules | 0.8-2.0 |
| Salt brine | 0.1-0.3 |
| Total | 100 |

The second example includes cereal flakes and provides 9 grams of sugar per 30 gram serving in the reduced sugar coating as opposed to 12 grams in the regular sugar coating. The coating comprises the sugar syrup, flavor and the type 4 resistant potato starch. The base cereal is coated with the coating at the indicated range level.

Example 2

Coated RTE Cereal Flakes

| Component | Weight % |
| --- | --- |
| Base cereal flakes | 60-74 |
| Sugar syrup | 27-33 |
| Flavor | 0.1-0.3 |
| Type 4 potato starch | 1.8-2.2 |
| Total | 100 |

The reduced sugar coatings of the present invention can be produced according to other formulations. As noted above preferably the final coated food product comprises from 0.1 to 10% by weight of type 4 resistant starch and preferably the resistant starch replaces the sugar at a ratio of from 0.1 to 1 parts of type 4 resistant starch per 3 parts of removed sugar, more preferably from 0.6 to 1 parts of type 4 resistant starch per 3 parts of removed sugar. The addition of the resistant starch does not require large changes to the manufacturing processes for existing coated products since it can easily be incorporated into existing sugar coatings after removal of some portion of the sugar. The coatings of the present invention also provide the advantage of enabling the appearance of a frosted product when used to replace the sugar. This is unlike other coatings using starches which are generally clear or transparent. The coatings can be used at any desired level, generally at levels of from 10 to 60% by weight based on the total weight of the coated food product, more preferably at from 30 to 50%. The amount of sugar that is removed from a coating composition is determined by the desired reduction.

Generally the amount of sugar reduction ranges from 5 to 50% by weight reduction of the sugar, in other cases it can range from 10 to 40% by weight and most preferably from 10 to 30% by weight.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A method of forming a reduced sugar coating composition for a food product comprising the steps of:
   a) removing a positive amount of sugar up to 50% of the total sugar from a sugar containing coating composition; and
   b) replacing the removed sugar with a composition consisting of a type 4 resistant starch,
   wherein said type 4 resistant starch is present at a ratio of from 0.1 to 1 parts of said type 4 resistant starch per 3 parts of said removed sugar thereby forming a reduced sugar coating composition, and
   wherein the level of said type 4 resistant starch comprises 10% or less by weight of the total weight of the food product to which the reduced sugar coating composition is applied.

2. The method of claim 1 wherein step b) comprises replacing the removed sugar with a type 4 resistant starch at a ratio of from 0.6 to 1 parts of said type 4 resistant starch per 3 parts of said removed sugar thereby forming a reduced sugar coating composition.

3. The method of claim 1 further comprising in step a) removing from 5 to 50% by weight of the sugar in the sugar containing coating composition.

4. The method of claim 1 further comprising in step a) removing from 10 to 40% by weight of the sugar in the sugar containing coating composition.

5. The method of claim 1 further comprising in step a) removing from 10 to 30% by weight of the sugar in the sugar containing coating composition.

6. The method of claim 1 wherein step b) further comprises replacing the removed sugar with a type 4 resistant starch from a source comprising at least one of potato, wheat, corn, rice, tapioca, quinoa, a legume, barley, banana, sorghum, oat, millet, sweet potato, or a mixture thereof.

7. The method of claim 1 comprising the further step after step b) of applying the reduced sugar coating composition topically on to a food product.

8. The method of claim 7 wherein the food product comprises a ready-to-eat cereal; a granola, a trail mix, an energy bar, a granola bar, a cookie, a cake, a pie, a cracker, or a muffin.

9. The method of claim 7 comprising applying the reduced sugar coating composition topically on to a food product in an amount of from 10 to 60% by weight based on the total weight of the food product with the applied coating composition.

10. The method of claim 7 comprising applying the reduced sugar coating composition topically on to a food product in an amount of from 30 to 50% by weight based on the total weight of the food product with the applied coating composition.

11. The method of claim 7 comprising applying the reduced sugar coating composition topically on to a food product in an amount such that the amount of type 4 resistant starch in the coating is from 0.1 to 10% by weight based on the total weight of the food product with the applied coating composition.

12. The method of claim 7 comprising applying the reduced sugar coating composition topically on to a food product in an amount such that the amount of type 4 resistant starch in the coating is from 1 to 6% by weight based on the total weight of the food product with the applied coating composition.

13. The method of claim 7 comprising applying the reduced sugar coating composition topically on to a food product in an amount such that the amount of type 4 resistant starch in the coating is from 1 to 5% by weight based on the total weight of the food product with the applied coating composition.

14. The method of claim 1 or claim 7 comprising adding as part of the reduced sugar coating composition at least one high intensity sweetener, a flavor, or a mixture thereof.

* * * * *